United States Patent
Eberlein et al.

(10) Patent No.: US 11,422,925 B2
(45) Date of Patent: Aug. 23, 2022

(54) VENDOR ASSISTED CUSTOMER INDIVIDUALIZED TESTING

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/028,690

(22) Filed: Sep. 22, 2020

(65) Prior Publication Data
US 2022/0091962 A1 Mar. 24, 2022

(51) Int. Cl.
G06F 9/44 (2018.01)
G06F 9/455 (2018.01)
G06F 9/445 (2018.01)
G06F 11/36 (2006.01)
G06F 8/61 (2018.01)
G06F 8/71 (2018.01)
G06Q 10/06 (2012.01)

(52) U.S. Cl.
CPC .............. *G06F 11/368* (2013.01); *G06F 8/61* (2013.01); *G06F 8/71* (2013.01); *G06F 11/3664* (2013.01); *G06F 11/3688* (2013.01); *G06Q 10/06395* (2013.01)

(58) Field of Classification Search
CPC . G06F 8/61; G06F 8/71; G06F 11/368; G06F 11/3664; G06F 11/3688; G06Q 10/06395
See application file for complete search history.

(56) References Cited

U.S. PATENT DOCUMENTS

| 10,922,216 | B1* | 2/2021 | Kumar | G06F 11/3684 |
| 2012/0159443 | A1* | 6/2012 | Kamenz | G06F 11/368 |
| | | | | 717/124 |
| 2013/0067427 | A1* | 3/2013 | Fox | G06F 21/00 |
| | | | | 717/101 |
| 2013/0152047 | A1* | 6/2013 | Moorthi | G06F 11/368 |
| | | | | 717/124 |
| 2014/0180961 | A1* | 6/2014 | Hankins | G06F 8/71 |
| | | | | 705/348 |
| 2017/0235661 | A1* | 8/2017 | Liu | G06F 8/443 |
| | | | | 717/106 |
| 2018/0203844 | A1* | 7/2018 | Greer | G06F 40/194 |
| 2019/0294536 | A1* | 9/2019 | Avisror | G06F 11/3688 |

(Continued)

OTHER PUBLICATIONS

Yuzhan Ma, Automatic Classification of Software Artifacts in Open-Source Applications, 2018, pp. 414-423. https://ieeexplore.ieee.org/stamp/stamp.jsp?tp=&arnumber=8595225&isnumber=8595153 (Year: 2018).*

(Continued)

*Primary Examiner* — Mongbao Nguyen
(74) *Attorney, Agent, or Firm* — Schwegman Lundberg & Woessner, P.A.

(57) ABSTRACT

A system is provided that enables tests created by a second entity to run with first entity data and configurations. A test module is able to assess test results with dynamic input (e.g., rule-based assessments). The system is also provided to run and test these test modules on the first entity system with first entity configuration and let the first entity define the test input and interpret the test results. This is not performed on all available tests, but only on the tests that are related to the change to be implemented.

20 Claims, 6 Drawing Sheets

(56) References Cited

U.S. PATENT DOCUMENTS

| | | | |
|---|---|---|---|
| 2020/0081814 A1* | 3/2020 | Srinivasan | G06F 8/71 |
| 2021/0042216 A1* | 2/2021 | Magnezi | G06F 8/30 |
| 2021/0109843 A1* | 4/2021 | Datta | G06F 11/3636 |
| 2021/0141717 A1* | 5/2021 | Ananthapur Bache | G06F 11/3688 |
| 2021/0182054 A1* | 6/2021 | Kalika | G06F 11/3692 |
| 2022/0066917 A1* | 3/2022 | Drebing | G06F 8/61 |

OTHER PUBLICATIONS

Yi Li, Semantic Slicing of Software Version Histories, 2018, pp. 182-199. https://ieeexplore.ieee.org/stamp/stamp.jsp?tp=&arnumber=7843626 (Year: 2018) (Year: 2018).*

* cited by examiner

VENDOR ASSISTED CUSTOMER INDIVIDUALIZED TESTING

TECHNICAL FIELD

This document generally relates to testing of computer software. More specifically, this document relates to vendor-assisted customer individualized testing.

BACKGROUND

Enterprise resource planning (ERP) systems allow for the integration of internal and external management information across an entire organization, including financial/accounting, manufacturing, sales and service, customer relationship management, and the like. The purpose of ERP is to facilitate the flow of information between business functions inside the organization and management connections to outside entities.

ERP products are typically developed and deployed by a vendor to multiple customers. In this case, the customers are typically themselves businesses or organizations that have a large number of users. These customers often will add extensions or perform modifications to the vendor-deployed ERP software. The software may run mission-critical processes for enterprises, and thus they need to be tested thoroughly, as failure can cause severe disruption and legal complications. The customer extensions or modifications, however, make testing more challenging.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
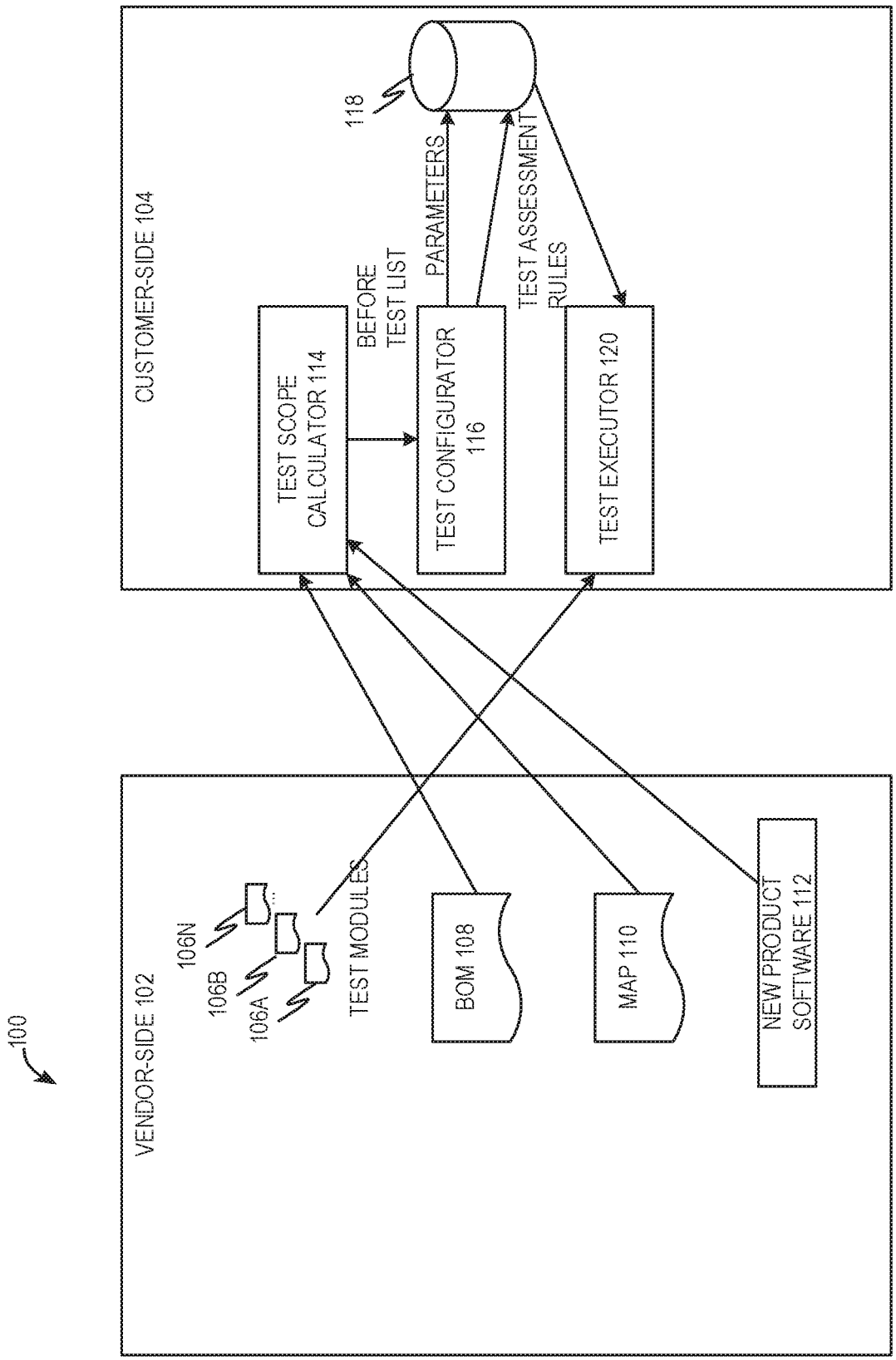
FIG. 1 is a block diagram illustrating a system for testing customer-specific ERP software in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a framework and processes for developing, delivering, and executing flexible test in an ERP system are provided. These tests can be adjusted by customers so they can execute standard vendor tests in customized systems and accurately test those customer-specific systems.

Applications in an ERP domain can be highly configured, extended, and even modified by customers to implement desired business processes. This holds for traditional on-premise ERP products, but also for more recent Software-as-a-Service (SaaS) offerings. The vendor of an ERP product typically tests the product code and a variation of configurations. With a large set of configuration options, however, the testing of configured business processes is limited. Not all variations configured by individual customers can be tested by a vendor. For customer-developed extensions or modifications of a vendor process, testing remains with the customer. Additionally, at least to a certain extent, the final test of the system configured with the customer needs to remain with the customer, as it cannot be anticipated and tested by the vendor.

Customer individualized testing involves asking the customer to test a new software version to be deployed. This can be difficult, however, for the customer to perform accurately. Most vendor tests are not applicable to configured and extended or modified customer systems. Developing a customer-specific test, however, would be extremely labor intensive and expensive. Customers often postpone updates and adjustments in order to perform this testing, which slows down the innovation cycle.

Additionally, running full sets of vendor tests on customer systems can lead to a very high load, long runtime, and manual efforts to configure, evaluate, and follow-up on test results. Further, running vendor tests in a customer system can lead to diverging results, due to the customer data and configuration, extensions, and modifications. Specifically, module tests operating on actual customer data with custom configurations applied and implicitly calling customer extensions and modifications can lead to different results of the test, even if the code is fine, and thus the result may diverge from the expected result.

Furthermore, running a full set of configuration options in vendor tests can lead to an unmanageable set of tests and create high costs to run, evaluate, and maintain the test.

In an example embodiment, first a system is provided that enables tests created by a vendor to run with customer data and configurations. The test module is able to assess test results with dynamic input (e.g., rule-based assessments). Second, a system is provided to run and test these test modules on the customer system with customer configuration and let the customer define the test input and interpret the test results. This is not performed on all available tests, but only on the tests that are related to the change to be deployed (e.g., a vendor upgrade or customer extension or modifications development or a combination of the two).

In order to refrain from running all potential tests, the number of tests to run and evaluate is minimized. A subset of tests are derived. This subset covers the intersection of "vendor changed" and "used by customer", plus the changes performed by the customer to extensions, modifications and customizing. As such, the test is run with the customer configuration, master and transactional data, as well as with customer extensions and modifications only a single time. By enabling the test module to select customer configuration and data as test input, the extensions and modifications by the customers can be enabled to run in the environment that they have been designed in.

FIG. 1 is a block diagram illustrating a system 100 for testing customer-specific ERP software in accordance with an example embodiment. The system 100 comprises a vendor-side 102 and a customer-side 104. Both the vendor-side 102 and the customer-side 104 may operate one or more modules on one or more computer servers.

Turning first to the vendor-side 102, the vendor may create one or more test modules 106A-106N to cover the relevant code and configuration tests. The test modules 106A-106N may be parameterized via a user interface and corresponding application program interface (API). They may define which input to read from the database(s) and have a rule set to assess the test result based on dynamic input retrieved from the database(s). The test module 106A-106N test result assessment rules can be configured or overwritten by a customer (as an extension to the test module).

The vendor also computes the set of code artifacts for each product version. This set of code artifacts includes a list of changed artifacts from a prior version of the product. This list of changed artifacts may be stored in a bill of material (BOM) 108. The vendor also creates a map 110 relating code artifacts listed in the BOM 108 to tests in the test modules 106A-106N. Each test module 106A-106N may be designed to have configurable parameter inputs, which are used to read input from customer databases during the customer test. They each also have a rule-based test assessment (able to check the result based on the configured input), as well as an option for a customer to adjust the rules for test assessment.

Also contained on the vendor-side 102 is the new product software 112 itself.

On the customer-side, a test scope calculator 114 reads a business configuration to determine a business process that the customer runs, and determines software artifacts and business configurations needed to run these process. It also reads the runtime history to determine the software artifacts which had been loaded into a runtime since the last change (or, alternatively, a smaller period of time). It takes the output of these two actions and checks with the BOM 108 to determine which of the artifacts that it needs that have been changed. It then maps these artifacts to the appropriate test module 106A-106N using the map 110 (including indirect use of the artifact by following a "where used" chain, as will be described in more detail below). It writes to a before-test list.

A test configurator 116 contains a user interface to show the test modules 106A-106N and their input parameters to a user of the customer. A test engineer can define custom test module parameter values. The test configurator 116 then writes the parameter values to a database. The user interface can display the test assessment rules, which the test engineer can then adjust. The test configurator 116 writes the adjusted rules to a database 118.

A test executor 120 then reads the test list and the test parameter values. It runs the corresponding test(s) on the system with the customer parameterization, and evaluates the test(s) by applying the corresponding defined assessment rules. The test executor 120 then receives the result of the test from a rules framework and stores it in a database. The test executor 120 may have a user interface to show tests executed and their values, rerun selected test (e.g., if parameter values or test assessment rules had been adjusted), disable test or mark tests as false positive (if a test cannot be corrected), and mark tests as expected to be corrected by change.

The test executor 120 user interface is also able to show the test modules and describe which changed and which need to be reviewed by the test engineer to adjust parameterization (or newly parameterized). The user interface can also show the results of tests executed before the change and after the change and visualize the differences and similarities. The user interface can also visualize which tests marked as expected to be corrected by change have changed from true positive to true negative. Finally, the user interface can show a summary of the tests, which are true positive in the after test list and are true negative in the before-test list.

The process begins with the development of a new version of a service or product together with tests for the new functionality. The process can be extended to provide the artifacts and capabilities in the system to run the tests in the customer instance later. A test module is provided to have configurable parameter input (used to read input from a customer database during customer tests), rules-based test assessment (being able to check the result based on configured input), and an option for a customer to adjust the rules for test assessment. Further, a registration entry in a map is provided, relating a test to a code artifact.

A list of changed artifacts is determined for every changed version of the software product.

A process is then performed before and after deploying a change to a test or production system. The system or service is in use on a certain release and a change should be applied (vendor version change or customer change). The change BOM of artifacts which will be changed is obtained. Then, using the change BOM, the list of existing tests (before change) to run to cover the change is computed.

For static calls, for each artifact, if the artifact is part of the map, the related test is added to the list of tests to run for this change (the before-test list). If the artifact is not in the map, then any modules calling the artifact are computed via a "where used" list, and then these calling modules are themselves processed to have their related test(s) be added to the list of tests to run for this change. Specifically, a where used list is a list maintained by the computer system of all the objects that call another object. If an artifact is viewed as a data type, for example, the where used list identifies all structures using the data types in a definition, all database tables using the data type, and all programs using the data type. Similarly, for a function, it lists which functions, classes and reports call the function.

Then, with the change BOM, the list of tests to run to cover the change is computed. For dynamic calls, for each artifact in the change BOM, the call stack history is read to identify if an artifact in the change BOM is in the call stack history. If so, the system goes back up the stack until a module is found that is part of the map, and the related test is added to the before test list.

The list of tests may then be presented to the user. If the tests are already configured in the repository, the data is read from there and shown as the default. The user can specify the parameterization for the tests and adjust the rules for the test modules assessing the results. This includes the data set to be used for the test. To improve the test significance and enable testing of actual customer objects that may be extended compared to the vendor definitions, canned test data is not used; therefore, customers need to select the set of actual data to be used for the test. This is why the number of tests to be performed should be minimized: to minimize the parameterization effort.

As the tests operate on the customer-specific data and execute custom code (in the form of extensions and modifications), test results may be different in customer systems compared to unmodified test systems at the software vendor. Therefore, test result assessment rules can be adjustable by customer.

For tests where customer extensions or modifications will be run during test execution, the user can be explicitly recommended to verify test parameterization and evaluation rules, as it is possible that vendor defaults will lead to incorrect results.

Then the test(s) is/are run. If there are tests that should have results of "ok", but show as "failed", the user may check to determine if this is a false positive test (if there is an error shown by the test despite the software being correct, the test is wrong). At this point, the test result assessment should be adjusted.

Once the test is confirmed, the change can be deployed to the system, together with the corresponding changed tests and updated map relating code artifacts to tests.

With the change BOM and the updated code to test map, the list of new tests (after the change) to run to cover the deployed change is computed. For static calls, if an artifact is a part of the map, the related test is added to the list of tests to run for this change (the after-test-list). If the artifact is not in the map, the modules calling the artifact are computed via "where used", and the process is iterated to repeat the addition of related tests for these calling artifacts.

With the change BOM, the list of tests to run to cover the dynamic calls is taken from the previous version of the software products, because there is no call stack history available yet for the new version.

The list of tests in the "before-test-list" and "after-test-list" can differ. Additionally, tests can be identified, for example, if additional tests are created by the vendor. Another scenario could be that the deployed change results in different call graphs and artifact dependencies leading to additional tests to run.

The list of tests can then be presented to the user. The tests are already configured before deploying the change. The data is read from the repository and shown as the result. The user can then specify the parameterization for the additional tests and adjust the rules for the test modules assessing the results.

The test(s) is/are run and the results checked. Two specific sets of test results are focused on. For a test with result "failed", the user checks if this is a false positive test. If so, the test result assessment is adjusted and the test rerun. For true positive tests, the user checks to see if the test failed before the change as well or if the change resulted in this test to fail. In the latter case, the customer can then decide how to adjust the change under test or plan the next change to cover this error.

For tests that had a failed result before the change was deployed, it is determined if the test passed after the change was deployed. If the change resolved the problem, this is the desired result. If the test still failed, the customer has to decide whether to adjust the change under test or plan the next change covering this error.

The test parameterizations are stored in a repository, which can ease the configuration of the next changes to deploy.

Note, the tests running include customer extensions and modifications and can be configured by the user to run on customer-specific data sets (customer business configuration, master data, and transactional data). When calling customer extensions and modifications, the use of customer data is crucial as the extension or modification can rely on altered data structures or on data semantics.

The primary focus of the above is to find errors that would be introduced by the change to be deployed; this may enable improving the change. Additionally, if a problem is known to start the release and a change is planned to resolve the problem, this needs to be confirmed by the tests. Another aspect is minimizing false positive results. The customer runs the test before implementing the change to the software program, and iterates on the test results in both scenarios to analyze if there are any false-positive tests to correct them. Specifically, the customer can adjust the test assessment rules as needed to reflect their situation. Ideally, there would be no false-positive results for any of the test modules prior to deploying the change to the software product. Thus, for example, if there are 10 test modules, the customer may run these 10 test modules before implementing the change to the software product, and examine the results to identify any false positives. False positives would be test modules that produce a report of a failure of a portion of code when there has been no failure of that portion of code (positive in this case meaning that the test has indeed indicated a problem, rather than implying that the test reporting a "good" outcome). If, for example, 4 of the test modules report a failure of a portion of code, this information may be presented to the customer and the customer may determine if any of these positives are false (i.e., if any of these 4 test modules reported an error where there really was no error). If, for example, 2 of the test modules are determined by the customer to have produced false positives and 2 of the test modules are determined by the customer to have produced true positives, the customer can adjust either the parameters of the 2 false positive test modules or the test assessment rules for the 2 false positive test modules and run these 2 modules again, repeating until there are no false positive test modules.

From a test design perspective, it is important to note that the tests are executed on actual customer data, not on canned test data. This tremendously increases the significance of the test results, but makes it such that test developers should implement tests that can work with unknown test data. For example, if a test creates a follow-up document and checks that certain fields were copied correctly from a source document (such as a purchase order created from a purchase requisition), then the test does not simply compare against hardcoded values from a canned purchase requisition object defined for the test but compares the fields of the purchase order against the purchase requisition object that the customer has configured as an input parameter for the test run. This allows it to cover extension fields that only exist in customer systems but are unknown to the software product vendor.

This greater flexibility in test results assessment also allows for the aforementioned rule adjustment in test evaluations. Again, test developers need not hardcode assertions of expected values but rather call a rule framework to validate the test results. The rules defined for each test can therefore be adjusted by the customer, for example, to add a rule for a custom field or remove a rule for a field that was deactivated in the follow-up document and therefore does not have the same value as the source document.

Figure 2:
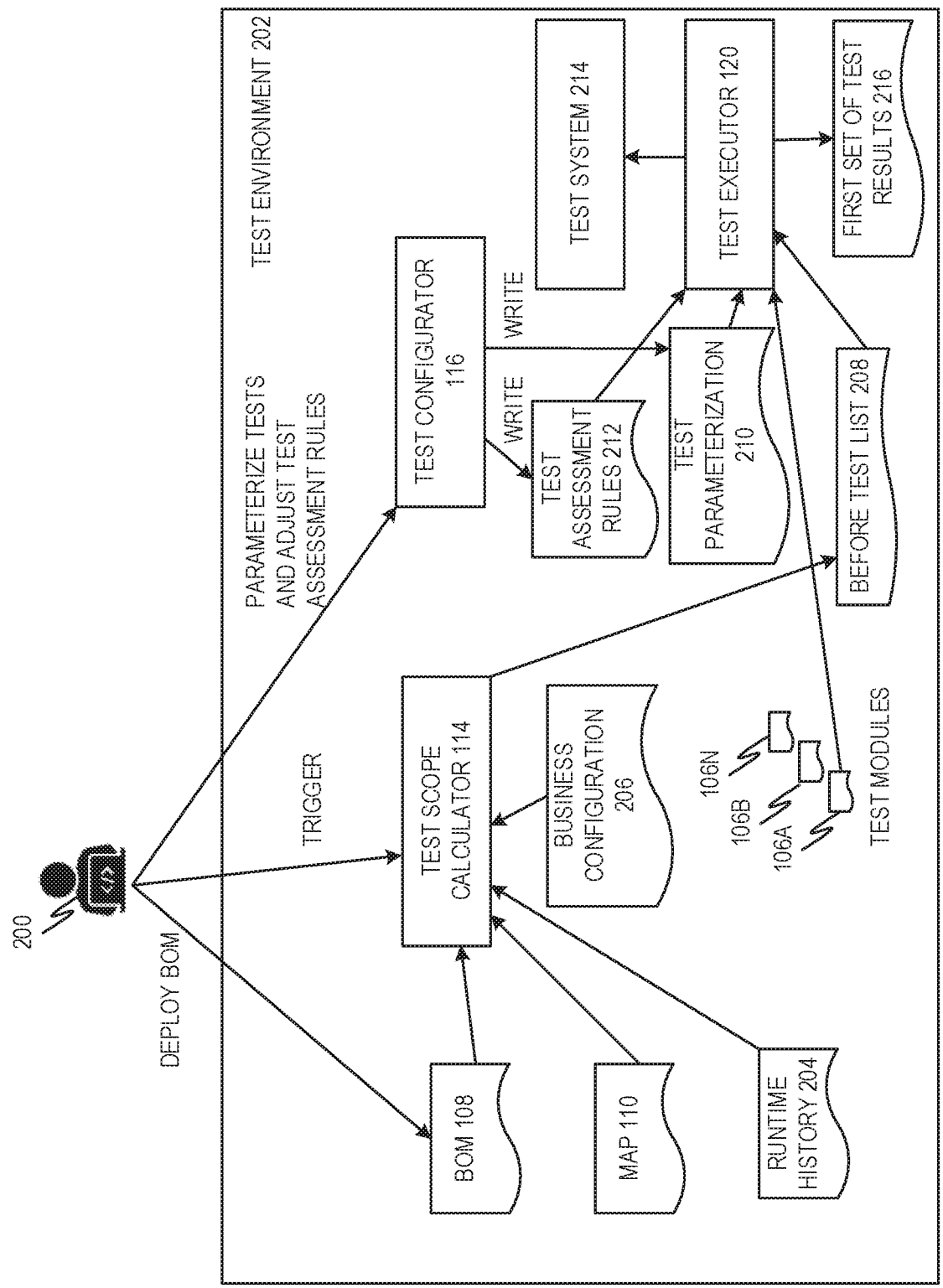
FIG. 2 is a diagram illustrating a first phase of a change process in accordance with an example embodiment.

The change process can therefore be thought of as two phases. In the first phase, the customer tests the software product prior to the change being implemented. In the second phase, the change is implemented and the customer tests the software product again. FIG. 2 is a diagram illustrating a first phase of a change process in accordance with an example embodiment. Here, the customer 200 (which may be a test engineer operating for the customer), first deploys a BOM 108 to a test environment 202, and then triggers a test scope calculator 114. The test scope calculator 114 then takes as input the BOM 108, as well as a runtime history 204, business configuration 206, map 110, one or more test modules 106A-106N. The test scope calculator 114 then produces a before-test list 208. The customer 200 also then parameterizes the tests into test parameterization 210 and adjusts test assessment rules 212 using a test configurator 116. A test executor 120 then takes as input the one or more test modules 106A-106N, the before test list 208, the test parameterization 210, and the test assessment rules 212 and executes the corresponding tests using a test system 214, producing a first set of test results 216.

Figure 3:
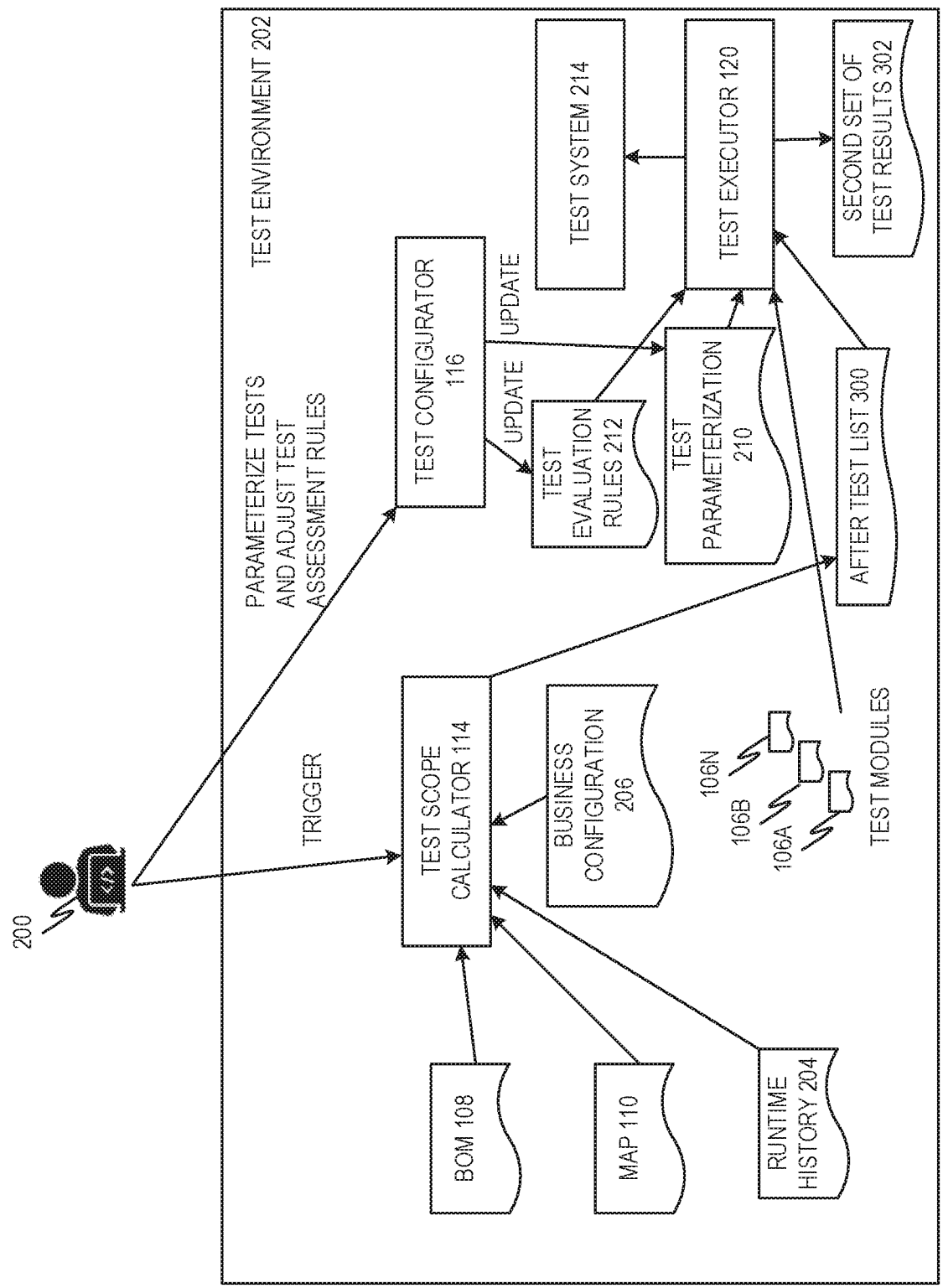
FIG. 3 is a diagram illustrating a second phase of a change process in accordance with an example embodiment.

FIG. 3 is a diagram illustrating a second phase of a change process in accordance with an example embodiment. Here, the customer 200 upgrades the version of the software product by applying the change and then triggers the test scope calculator 114 to recalculate test scope. The test scope calculator 114 then again takes as input the BOM 108, as well as a runtime history 204, business configuration 206, map 110, one or more test modules 106A-106N, and produces an after-test list 300. The customer then updates the parameterization of the tests into test parameterization 210 and adjusts test assessment rules 212 using the test configurator 116. The test executor 120 then takes as input the one or more test modules 106A-106N, the after-test list 300, the test parameterization 210, and the test assessment rules 212 and executes the corresponding tests using a test system 214, producing a second set of test results 302.

Figure 4:
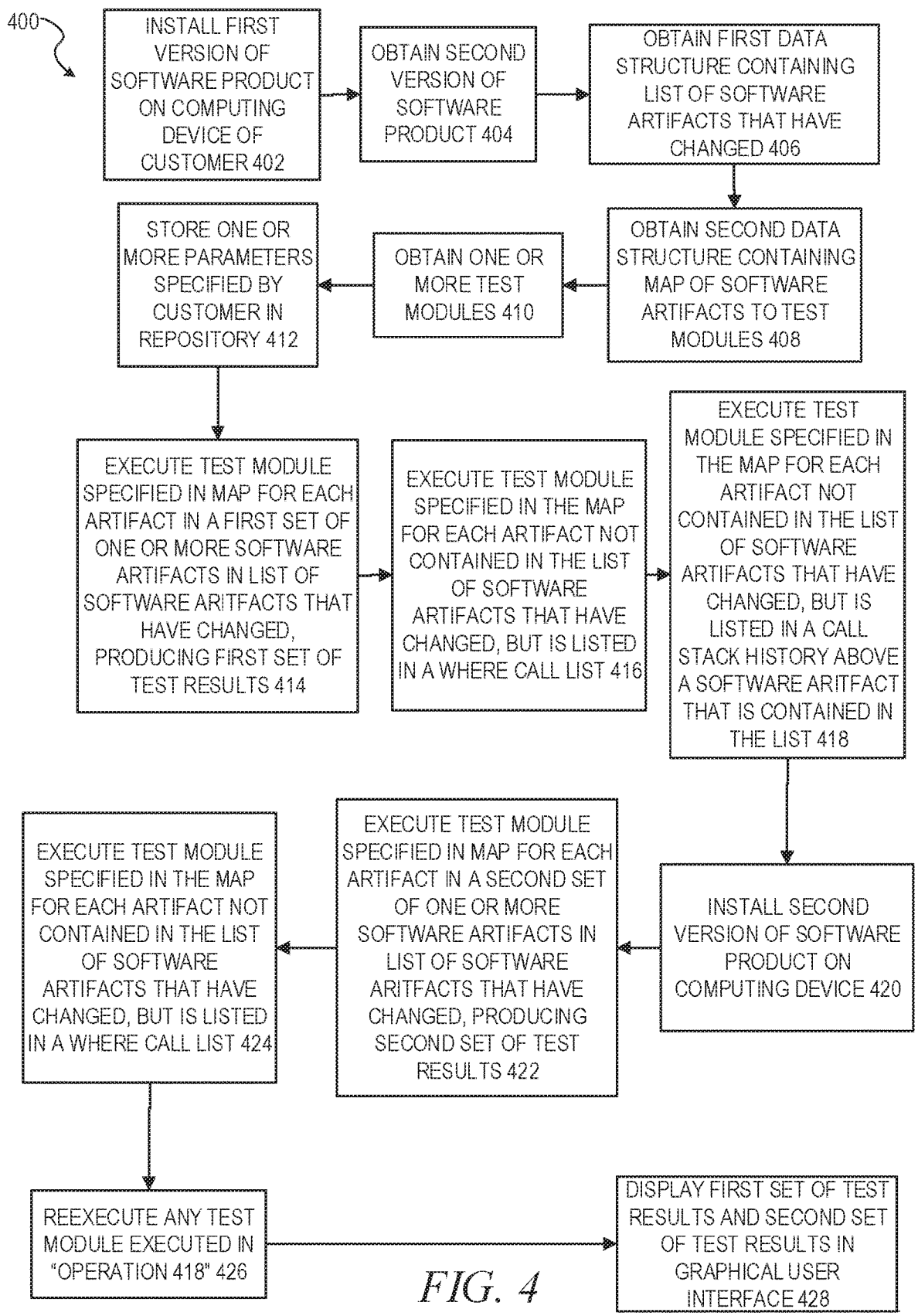
FIG. 4 is a flow diagram illustrating a method of testing a software product in accordance with an example embodiment.

FIG. 4 is a flow diagram illustrating a method 400 of testing a software product in accordance with an example embodiment. In an example embodiment, the method 400 is performed at a customer computer system. At operation 402, a first version of a software product is installed on a computing device of the customer. At operation 404, a second version of the software product is obtained from a vendor. At operation 406, a first data structure containing a list of software artifacts that have changed from the first version of the software product to the second version of the software product is obtained from the vendor. At operation 408, a second data structure containing a map of software artifacts to test modules is obtained from the vendor. At operation 410, one or more test modules are obtained from the vendor. Each test module may contain code that, when executed, performs a test on a currently-installed version of the software product using one or more parameters specified by the customer, and also contains one or more customizable test assessment rules that, when executed, determine whether the corresponding test has passed or failed.

At operation 412, the one or more parameters specified by the customer are stored in a repository. At operation 414, a test module specified in the map for each artifact in a first set of one or more software artifacts in the list of software artifacts that have changed is executed, producing a first set of test results. At operation 416, a test module specified in the map for each artifact that is not contained in the list of software artifacts that have changed, but is listed in a where-used call list as having called a software artifact that is contained in the list of software artifacts that have changed and that is on the map, is executed, augmenting the first set of test results. At operation 418, a test module specified in the map for any software artifact that is not contained in the list of software artifacts that have changed, but is listed in a call stack history above a software artifact that is contained in the list of software artifacts that have changed, is executed, augmenting the first set of test results. It should be noted that operations 414, 416, and 418 need not be executed as completely independent operations and their substeps may indeed be interleaved. For example, the list of test of modules to execute may be computed by identifying all the test modules to execute using the operations described in operations 414, 416, and 418 prior to any execution actually occurring.

At operation 420, the second version of the software product is installed on the computing device. At operation 422, a test module specified in the map for each artifact in a second set of one or more software artifacts in the list of software artifacts that have changed is executed, producing a second set of test results. At operation 424, a test module specified in the map for each artifact that is not contained in the list of software artifacts that have changed, but is listed in a where-call list as having called a software artifact that is contained in the list of software artifacts that have changed and that is on the map, is executed, augmenting the second set of test results. At operation 426, any tests modules executed in operation 418 are reexecuted, augmenting the second set of test results. At operation 428, the first set of test results and the second set of test results are displayed in a graphical user interface.

Figure 5:
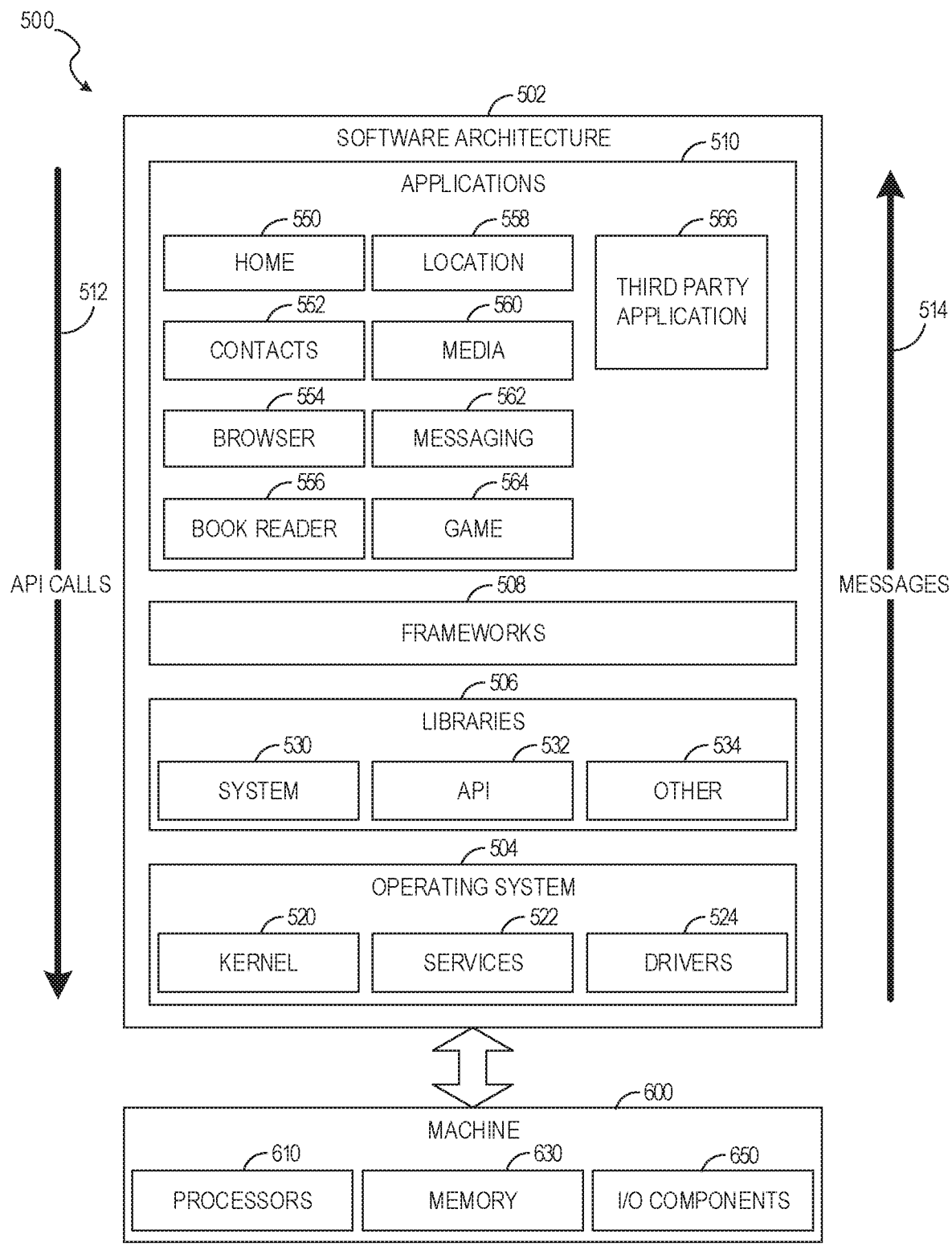
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
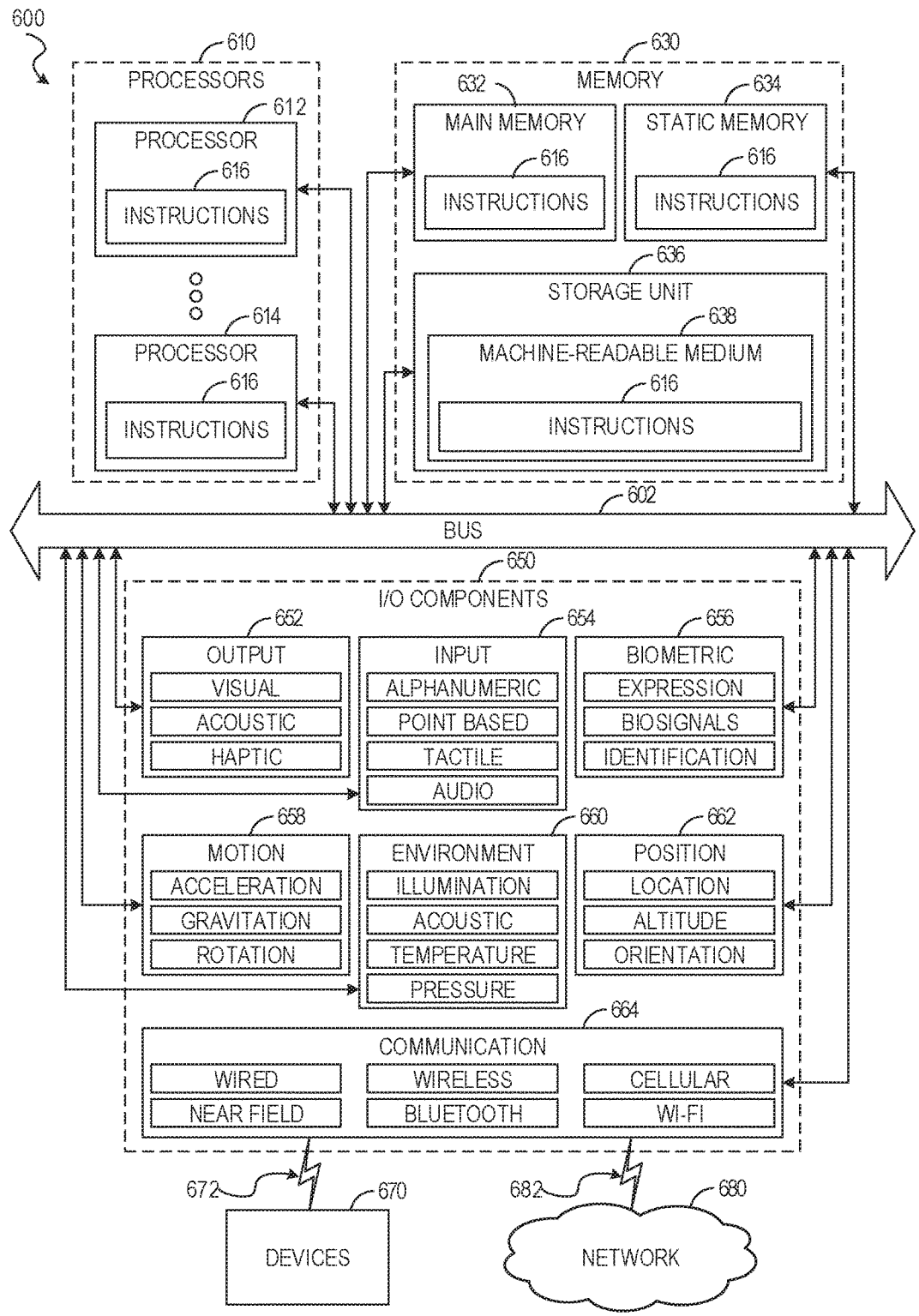
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination. For example, in a first implementation, a computer-implemented method comprises:
installing a first version of a software program on a computing device of a first entity;
obtaining, from a second entity, a second version of the software program;
obtaining a first data structure containing a list of software artifacts that have changed from the first version of the software program to the second version of the software program;
obtaining a second data structure containing a map of software artifacts to test modules;
obtaining one or more test modules, each test module containing code that, when executed, performs a test on a currently-installed version of the software program using one or more parameters specified by the first entity;
storing the one or more parameters specified by the first entity in a repository;
executing a test module specified in the map for each artifact in a first set of one or more software artifacts in the list of software artifacts that have changed, producing a first set of test results;
installing the second version of the software program on the computing device;
executing a test module specified in the map for each artifact in a second set of one or more software artifacts in the list of software artifacts that have changed, producing a second set of test results; and
causing display, in a graphical user interface, the first set of test results and the second set of test results.

The foregoing and other described implementations can each, optionally, include one or more of the following features:

A first feature, combinable with any of the following features, wherein the first set of one or more software artifacts does not include any software artifacts that are contained in modules that have not been previously used by the first entity.

A second feature, combinable with any of the following, wherein the first set of one or more software artifacts includes a plurality of software artifacts identified by:
identifying a first software artifact that is in a call stack history of the computing device for the first version of the software program and that is contained in the map; and
identifying any other software artifacts that are higher up in the call stack history from the first software artifact, and that are also contained in the map.

A third feature, combinable with any of the following features, wherein at least one test module includes custom code provided by the first entity.

A fourth feature, combinable with any of the following features, wherein each test module includes a set of test rules, the test rules executed to determine whether results of the corresponding test are positive or negative.

A fifth feature, combinable with any of the following features, wherein at least one test module includes custom rules provided by the first entity.

A sixth feature, combinable with any of the following features, wherein the executing a test module further includes executing a test module specified in the map for each artifact that is contained in a where used list on the computing device, as having used an artifact that is contained in the list of software objects that have changed but that is not contained in the map.

What is claimed is:
1. A method comprising:
installing a first version of a software program on a computing device of a first entity, the first entity being a customer;
obtaining, from a second entity, a second version of the software program, the second entity being a vendor;
obtaining a first data structure containing a list of software artifacts that have changed from the first version of the software program to the second version of the software program;
obtaining a second data structure containing a map of the software artifacts to test modules;
obtaining one or more test modules, each test module containing code that, when executed, performs a test on the installed first version of the software program on the computing device of the first entity using one or more parameters specified by the first entity;
storing the one or more parameters specified by the first entity in a repository;
executing a test module specified in the map for each artifact in a first set of one or more software artifacts in the list of software artifacts that have changed, producing a first set of test results;
installing the second version of the software program on the computing device;
executing a test module specified in the map for each artifact in a second set of one or more software artifacts in the list of software artifacts that have changed, producing a second set of test results; and
causing display, in a graphical user interface, the first set of test results and the second set of test results.

2. The method of claim 1, wherein the first set of one or more software artifacts does not include any software artifacts that are contained in modules that have not been previously used by the first entity.

3. The method of claim 1, wherein the first set of one or more software artifacts includes a plurality of software artifacts identified by:
identifying a first software artifact that is in a call stack history of the computing device for the first version of the software program and that is contained in the map; and
identifying any other software artifacts that are higher up in the call stack history from the first software artifact, and that are also contained in the map, wherein software artifacts with more recent calls are higher up in the call stack history than software artifacts with less recent calls.

4. The method of claim 1, wherein at least one test module includes custom code provided by the first entity.

5. The method of claim 1, wherein each test module includes a set of test rules, the test rules executed to determine whether results of a corresponding test are positive or negative.

6. The method of claim 5, wherein at least one test module includes custom rules provided by the first entity.

7. The method of claim 1, wherein the executing a test module further includes executing a test module specified in the map for each artifact that is contained in a where-used list on the computing device, as having used an artifact that is contained in the list of software artifacts that have changed but that is not contained in the map.

8. A system comprising;
at least one hardware processor; and
a non-transitory computer-readable medium storing instructions that, when executed by the at least one hardware processor, cause the at least one hardware processor to perform operations comprising:
installing a first version of a software program on a computing device of a first entity, the first entity being a customer;
obtaining, from a second entity, a second version of the software program, the second entity being a vendor;
obtaining a first data structure containing a list of software artifacts that have changed from the first version of the software program to the second version of the software program;
obtaining a second data structure containing a map of the software artifacts to test modules;
obtaining one or more test modules, each test module containing code that, when executed, performs a test on the installed first version of the software program on the computing device of the first entity using one or more parameters specified by the first entity;
storing the one or more parameters specified by the first entity in a repository;
executing a test module specified in the map for each artifact in a first set of one or more software artifacts in the list of software artifacts that have changed, producing a first set of test results;
installing the second version of the software program on the computing device;
executing a test module specified in the map for each artifact in a second set of one or more software artifacts in the list of software artifacts that have changed, producing a second set of test results; and
causing display, in a graphical user interface, the first set of test results and the second set of test results.

9. The system of claim 8, wherein the first set of one or more software artifacts does not include any software artifacts that are contained in modules that have not been previously used by the first entity.

10. The system of claim 8, wherein the first set of one or more software artifacts includes a plurality of software artifacts identified by:
identifying a first software artifact that is in a call stack history of the computing device for the first version of the software program and that is contained in the map; and
identifying any other software artifacts that are higher up in the call stack history from the first software artifact, and that are also contained in the map, wherein software artifacts with more recent calls are higher up in the call stack history than software artifacts with less recent calls.

11. The system of claim 8, wherein at least one test module includes custom code provided by the first entity.

12. The system of claim 8, wherein each test module includes a set of test rules, the test rules executed to determine whether results of a corresponding test are positive or negative.

13. The system of claim 12, wherein at least one test module includes custom rules provided by the first entity.

14. The system of claim 8, wherein the executing a test module further includes executing a test module specified in the map for each artifact that is contained in a where-used list on the computing device, as having used an artifact that is contained in the list of software artifacts that have changed but that is not contained in the map.

15. A non-transitory machine-readable medium storing instructions which, when executed by one or more processors, cause the one or more processors to perform operations comprising:
installing a first version of a software program on a computing device of a first entity, the first entity being a customer;
obtaining, from a second entity, a second version of the software program, the second entity being a vendor;
obtaining a first data structure containing a list of software artifacts that have changed from the first version of the software program to the second version of the software program;
obtaining a second data structure containing a map of the software artifacts to test modules;
obtaining one or more test modules, each test module containing code that, when executed, performs a test on the installed first version of the software program on the computing device of the first entity using one or more parameters specified by the first entity;
storing the one or more parameters specified by the first entity in a repository;
executing a test module specified in the map for each artifact in a first set of one or more software artifacts in the list of software artifacts that have changed, producing a first set of test results;
installing the second version of the software program on the computing device;
executing a test module specified in the map for each artifact in a second set of one or more software artifacts in the list of software artifacts that have changed, producing a second set of test results; and
causing display, in a graphical user interface, the first set of test results and the second set of test results.

16. The non-transitory machine-readable medium of claim 15, wherein the first set of one or more software artifacts does not include any software artifacts that are contained in modules that have not been previously used by the first entity.

17. The non-transitory machine-readable medium of claim 15, wherein the first set of one or more software artifacts includes a plurality of software artifacts identified by:
  identifying a first software artifact that is in a call stack history of the computing device for the first version of the software program and that is contained in the map; and
  identifying any other software artifacts that are higher up in the call stack history from the first software artifact, and that are also contained in the map, wherein software artifacts with more recent calls are higher up in the call stack history than software artifacts with less recent calls.

18. The non-transitory machine-readable medium of claim 15, wherein at least one test module includes custom code provided by the first entity.

19. The non-transitory machine-readable medium of claim 15, wherein each test module includes a set of test rules, the test rules executed to determine whether results of a corresponding test are positive or negative.

20. The non-transitory machine-readable medium of claim 19, wherein at least one test module includes custom rules provided by the first entity.

\* \* \* \* \*